(No Model.)

J. R. BAKER.
CAR AXLE BEARING.

No. 259,352. Patented June 13, 1882.

WITNESSES:
Chas. Nida
H. L. Wattenberg

INVENTOR:
Jackson R. Baker,
BY
ATTORNEY

UNITED STATES PATENT OFFICE.

JACKSON R. BAKER, OF JERSEY CITY, NEW JERSEY.

CAR-AXLE BEARING.

SPECIFICATION forming part of Letters Patent No. 259,352, dated June 13, 1882.

Application filed July 30, 1881. (No model.)

*To all whom it may concern:*

Be it known that I, JACKSON R. BAKER, of Jersey City, in the county of Hudson and State of New Jersey, have invented a new and useful Improvement in Car-Axle Bearings; and I hereby declare that the following is a full, clear, and exact description of the same, reference being had to the accompanying drawings, making part of this specification.

This invention is in the nature of an improvement in car-axle bearings.

The invention consists in a bearing for car-axles provided with a strip of perforated lead soldered thereto and extending centrally in the direction of the length of the bearing, as is more particularly described hereinafter.

Figure 1:
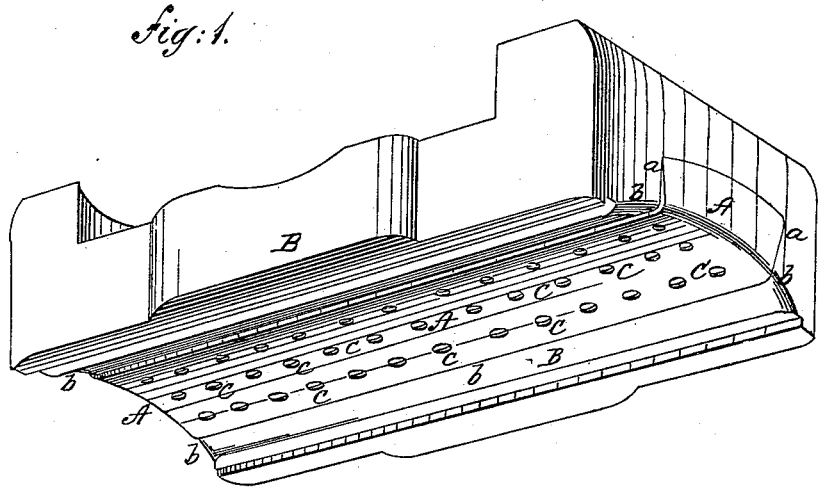
Figure 2:
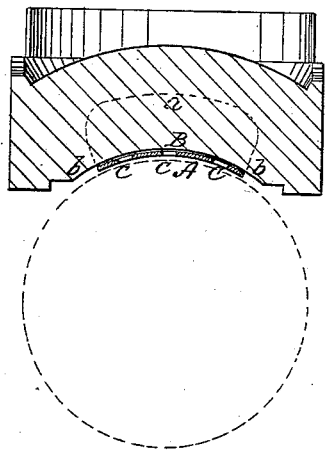

In the accompanying sheet of drawings, Figure 1 represents a perspective view of my improved bearing, and Fig. 2 a cross-section of same.

Similar letters of reference indicate like parts in the two figures.

The well-known heating of car-axles in their bearings is particularly liable to occur when the bearings are new, and is due to the fact that the bearing and axle have not yet been brought to that exact closeness of fit that alone will permit uniform and steady rotation of the axle in its box or bearing, which is essential to producing the least amount of friction. This uniform and smooth bearing between the axle and its bearing is ordinarily brought about by the use of the car to which they are attached on the road, when by a slow grinding process the bearing is brought to an accurate fit upon the axle; but by this process frequent heating of the axle and its bearing takes place, and delays ensue.

It is the purpose of the present invention to obviate these difficulties by providing the bearing with a strip of yielding metal—such as lead—which will at once accommodate itself to any inequalities in the axle or its bearing, at once making a close and accurate fit between the two, which is maintained until the axle is worn smooth and it and its bearing are truly fitted to one another, the lead gradually wearing away as the axle and its bearing are brought to a uniform fit. By interposing this strip of lead between the axle and its bearing not only are the surfaces of the axle and bearing brought to an accurate fit at once, as before stated, but all lost motion between the axle and its bearing is prevented and a saving effected. Besides, the danger of unequal wear between the axle and its bearing is rendered impossible.

In constructing my bearing I take a strip, A, of ordinary soft sheet-lead of a thickness of about the sixteenth of an inch, or less. This strip of soft lead is laid in the bearing B in the direction of its length, and it is soldered to the bearing, as at *a;* but the leaden strip does not completely line the inner surface of the bearing, but covers only what may be termed the "crown" of the bearing, leaving the bearing on either side, *b,* of the leaden strip uncovered. Before placing this leaden strip into the bearing it is perforated with holes C, for the purpose of forming chambers to hold the oil or other lubricant, which is supplied to the bearing in the usual manner, each hole forming a small reservoir of oil, which it gives out freely as the axle rotates, to be again supplied by the rotation of the axle.

I am aware that perforated copper or brass interior linings have been employed in bearings, the copper or brass, however, completely covering the surface of the bearing; and I am also aware that unperforated sheet-lead has been employed for lining bearings; but such lead linings also completely covered the surface of the bearing; but to cover entirely the inner surface of the bearing in this way has to some extent been found objectionable, for several reasons not necessary here to mention, and neither the copper nor the brass afford so good a substance for the purpose designed as the soft sheet-lead. Besides, in the copper and brass linings before referred to these linings were of considerable thickness, and the perforations were made of particular form by rolling the linings after the perforations were made. I do not therefore claim broadly either a soft-metal lining for bearing-brasses or linings with perforations formed therein; but What I do claim as new, and desire to secure by Letters Patent, is—

A bearing-brass for axles, in combination with a strip of perforated soft lead soldered thereto and interposed between the axle and the crown of the bearing, the bearing on each side *b* of the leaden strip being left uncovered, substantially as and for the purpose described.

JACKSON R. BAKER.

Witnesses:
JAMES E. RYDER,
H. L. WATTENBERG.